United States Patent Office 2,935,539
Patented May 3, 1960

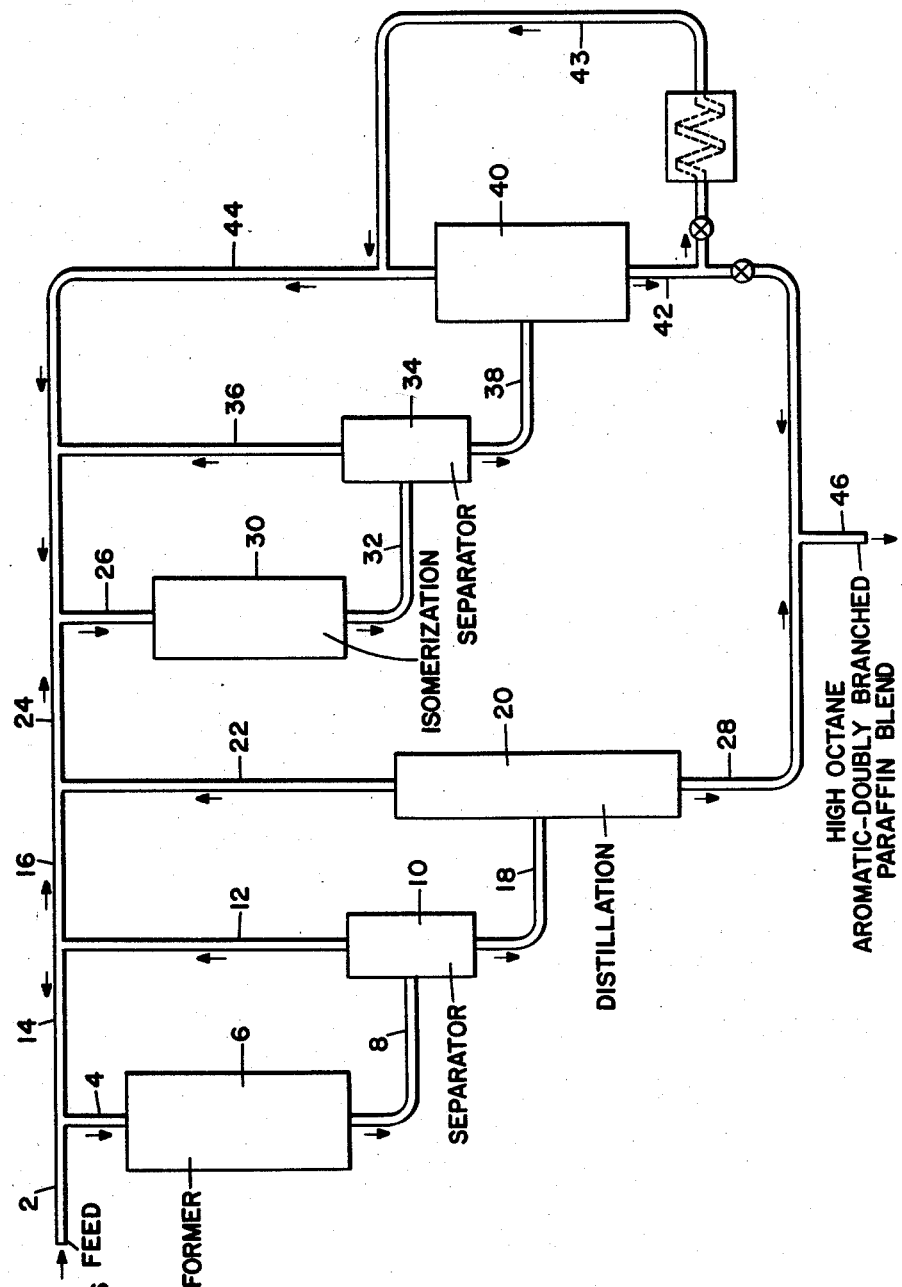

2,935,539

HYDROCARBON SEPARATION PROCESS USING METALLIC AMINE COMPLEX SUBSTITUTED MOLECULAR SIEVES

Elroy Merle Gladrow and William Judson Mattox, Baton Rouge, La., assignors to Esso Research and Engineering Company, a corporation of Delaware Application April 25, 1958, Serial No. 730,938

8 Claims. (Cl. 260—676)

The present invention relates to a process for separating hydrocarbons from their mixtures with one another, and more particularly, to the separation of hydrocarbons which are difficult to separate by distillation because of their similarity of boiling points or their azeotroping characteristics. Still more particularly, the present invention relates to the separation of hydrocarbons from their mixtures with certain natural or synthetic crystalline zeolites having pore openings of uniform diameter of about 6 to 15 Angstrom units.

It has long been known that certain porous substances, such as silica gel, activated char, and indeed zeolites, have certain selective adsorption characteristics useful in resolving a hydrocarbon mixture into its components. Thus silica gel is selective to removing aromatic hydrocarbons from non-aromatic hydrocarbons, and activated chars are useful in separating olefins from mixtures with paraffins. Similarly, certain crystalline zeolites having pore openings of about 5 Angstroms, and known as molecular sieves, have the capacity of adsorbing and thus separating straight chain from branched chain and cyclic hydrocarbons. The mineral chabazite is such a zeolite; branched chain hydrocarbons have a molecular diameter greater than about 5 Angstroms and are thus not able to get into the pores.[1]

There are many separations, however, that these solid, porous adsorbents are not capable of making efficiently. Thus it would be highly desirable to separate singly branched from doubly branched chain hydrocarbons, particularly in the $C_5$–$C_6$ range. In the present high octane requirements for modern high compression engines, an important petroleum refining step is isomerizing normal pentane and hexane, which are the principal constituents of light virgin naphtha. Isomerization by a Friedel-Crafts catalyst converts, for instance, low octane n-hexane to a mixture of methyl pentanes and dimethyl butane. Though the methyl pentanes have a higher octane rating than the normal hexane, they are, in turn, much lower than dimethylbutane. This fact requires that the product from the isomerization unit be fractionated and that the methyl pentanes be recycled. Since the boiling point of these products are very close, elaborate superfractionation equipment is required.

Similarly, in certain petrochemical processes it is necessary to separate close boiling fractions prior to subjecting one of these fractions to further processing. Thus, in the preparation of adipic acid from cyclohexane by oxidation, it is necessary to separate the cyclohexane from close boiling isoparaffins also present in the straight run naphthas. Here again, superfractionation is normally required; cyclohexane boils at 177° F. while the dimethyl pentanes boil at 175° to 179° F.

It is thus an object of the present invention to provide a highly efficient process for separating close boiling hydrocarbons without the necessity of superfractionation.

It is a still further object of the present invention to employ a selective adsorbent to separate close boiling cyclic and branched chain hydrocarbons, and singly branched from more highly branched hydrocarbons.

It is a still further object of the present invention to describe a light naphtha octane improvement process yielding a particularly high octane gasoline.

Other and further objects and advantages of the present invention will become more clear hereinafter.

In accordance with the present invention there is employed as a selective hydrocarbon separation agent a class of metal salts of a crystalline alumino-silicate having pore openings of uniform size, of from about 10 to 13 Angstroms. This class is characterized in that they are the ammonia and amine complex salts of these alumino-silicates, such as the cobalt, nickel, copper, platinum, and the like. These materials may readily be prepared by mixing and heating sodium aluminate and sodium silicate, preferably sodium metasilicate under carefully controlled conditions of temperatures, concentrations, and alkalinity, to produce a crystalline product which is subsequently converted into the metallic amino complex.

The preparation of the separating agent involves the maintenance of several critical steps. These are (1) the ratio of soda to silica, (2) the reaction temperature, (3) the pH of the solution from which the sodium alumino-silicate is crystallized, and (4) the ratio of silica to alumina. Unless these critical conditions are observed, the resulting composition will either not be crystalline, or it will have little or no adsorptive properties, the pores will not be uniform, or the pores, if uniform, will be too small to admit any but small diameter molecules. If the conditions are observed, the pores will be large enough to admit most organic molecules, and will be between 6 and 15 Angstroms.

The ratio of $Na_2O/SiO_2$ in the silicate employed must be at least 0.5:1, but may be as high as 2:1. Preferably, the ratio is 0.7:1 to 1:1, and the desired reagent is sodium metasilicate. If water glass is employed, additional caustic must be present.

The composition of the sodium aluminate is less critical. Sodium aluminates having any ratio of soda to alumina in the range of 1:1 to 3:1 may be employed; however, a sodium aluminate having a high ratio of soda to alumina is preferred, and a sodium aluminate having the ratio of about 1.5:1 $Na_2O/Al_2O_3$ is particularly desirable. The amounts of sodium silicate solution and sodium aluminate solution are such that the mol ratio of silica to alumina in the final mixture is at least 2.2:1, and preferably 2.5–4:1. However, silica to alumina ratios as high as 10:1 may be employed.

The method of mixing the sodium metasilicate and sodium aluminate solutions must be carried out in a manner allowing formation of a precipitate having a uniform composition. A good method is to add the aluminate to the silicate at ambient temperatures using rapid and efficient agitation to make a homogeneous paste. Thereafter, the mixture is heated to about 180° to 215° F. for a period of 0.5 to 10 hours to ensure crystallization in the form having interstices large enough to adsorb isoparaffinic and aromatic molecules. The heat-soaking step is essential; however, heating at temperatures of about 300° F. and higher does not produce a crystalline composition having the desired uniform size pore openings of about 10 to 13 Angstrom units.

A general scheme for preparing the zeolite is as follows: A solution of sodium metasilicate is prepared, having a concentration of 30 to 300 grams, preferably 100 to 200 grams per liter. Similarly, a solution of sodium

---

[1] An article by R. M. Barrer, "Molecular Sieve Action of Solids," appearing in Quarterly Reviews, vol. III, pages 293–320 (1949), and published by the Chemical Society (London), describes these materials well. See also U.S. 2,306,610 (Barrer), 1942.

aluminate having an $Al_2O_3$ concentration of 40 to 400 grams; preferably 200 to 300 grams, is prepared. The amounts of metasilicate and aluminate solutions employed are such that the ratio of $SiO_2/Al_2O_3$ in the final mixture is 2.2:1 to 10:1, preferably 2.5:1 to 4:1. The solutions are mixed, preferably at ambient temperatures. The slurry is of such concentration that the pH is above 12. Considering the amount of sodium atoms present in the total composite, the total volume of slurry should be adjusted so that each liter of composite slurry contains about 2 to 6 equivalents of sodium, preferably about 3 to 5 equivalents of sodium. The resulting slurry is heated from 180° to 250° F., but below 300° F., for a period of time depending on the temperature. At 210° F., this is about 3 to 24 hours, and shorter at higher temperatures, although long heating times may be employed without producing any deleterious effects.

The crystalline sodium alumino-silicate is then reacted with an amine complex such as $Co(NH_3)_6Cl_2$, $Co(NH_3)_6Cl_3$, $Ni(NH_3)_6Cl_2$ and other similar salts. Thus, the sodium alumino-silicate may be dried and then suspended in an ammoniacal solution of a group VIII metal or $Cu^{++}$, $Zn^{++}$, $Ag^+$, or $Cd^{++}$. Preferred are cobalt and nickel. The chloride, sulfate or nitrates comprise 1 to 20% by weight of the total solution, preferably about 3 to 8%. The solution employed is of such volume as to contain the metal in 0.5 to 2 times the stoichiometric amount of replaceable sodium. The reaction product is filtered, washed and dried, and activated by heating to 300° F.

It is evident that beside the $Co(NH_3)_6^{++}$ and and $Ni(NH_3)_6^{++}$ ions, the lower Werner complexes such as $Co(NH_3)_4^{++}$ and $Ni(NH_3)_4^{++}$ ions may be employed. Similarly, other inner complexing agents such as the enneo $(CH_2NH_2)_2$ group and the penneo $$(NH_2CH_2CH_2CH_2NH_2)$$

etc. groups may be used.

The crystalline product resulting from treatment with the cobalt amino complex salt has the stoichiometric composition $Co(NH_3)_6O.Al_2O_3.2.7SiO_2$.

The reaction product prepared in accordance with the process described above has the surprising property of selectively adsorbing doubly branched chain hydrocarbons from their admixture with singly branched and normal hydrocarbons. On the other hand, non-complexed salts of the same alumino-silicates have the opposite effect of selectively adsorbing singly branched hydrocarbons and rejecting the doubly branched isomers and homologues. Now though the doubly branched hydrocarbons are the more valuable high octane compounds, they generally are present in substantially smaller amounts in octane improving processes, such as isomerizates, than the singly branched isomers. This normally requires either a superfractionation step to make the separation so that the singly branched compounds may be recycled to the octane improving process, or an adsorption step wherein the major constituent (the singly branched compounds) would be adsorbed and the minor constituent (the doubly branched) would be recovered as product. This is, of course, undesirable as it requires large volumes of adsorbent.

In accordance with the present invention, however, it is the minor constituent that is adsorbed and the major constituent that appears in the raffinate. This makes recovery of absorbed doubly branched hydrocarbons more economical.

An application of the present invention may readily be understood when read in conjunction with the accompanying drawing, which is a flow plan of an embodiment of the invention depicting as an example, the upgrading of a light naphtha boiling in the range of about 120° to 180° F.

Turning now to this figure, there is shown in combination a hydroformer of conventional design, an isomerization unit and the selective adsorption zone of the present invention. A light virgin naphtha composed predominantly of n-pentanes and n-hexanes, with some naphthenic components, is initially passed into hydroforming unit 6 where, under mild conditions of pressure, temperature and other variables, the cycloparaffins are converted into high octane aromatics, all in a manner known per se. Suitable conditions will include temperatures of 800° to 1000° F., pressures of near atmospheric to 200 p.s.i., and feed rates of 0.2 to 5 v./v./hr. for catalysts such as molybdena-alumina, platinum-alumina, etc. The reaction product is withdrawn through line 8, hydrogen separated in separator 10 for recycle to the hydroformer, and the hydroformate, consisting of benzene and normal and iso-pentanes and hexanes, passed via line 18 to distillation zone 20. The aromatic fraction is readily separated from the paraffins by distillation and is withdrawn as a product stream through lines 28 and 46.

The paraffins are removed overhead through line 22, and passed via lines 24 and 26 to isomerization zone 30. In this zone, under the influence of a Friedel-Crafts isomerization catalyst, such as an aluminum halide supported on a carrier such as $Al_2O_3$, Porocel and the like, the naphtha stream is subjected to an isomerization reaction to convert normal to iso-paraffins. Reaction conditions are well-known, and may be in the range of 50° to 120° F. if $AlBr_3$ is used, and 75° to 200° F. if $AlCl_3$ is employed. Preferably, the reaction is carried out in the liquid phase. Promoters may be present, and in one embodiment, hydrogen is admitted with the feed to decrease cracking.

The isomerizate, containing about 5 to 20% n-paraffins, 10 to 20% singly branched hydrocarbons, and 30 to 60% doubly branched hydrocarbons, may be passed to separator 34 via line 32 for hydrogen recycle, and then passed via line 38 to adsorption zone 40. This is a tower containing the zeolites described above. Preferably, the feed is in the vaporized form. The adsorbent may be arranged in trays, or packed on supports or be unsupported. The conditions for most efficient separation vary in accordance with the constituents of the mixture, but in general, conditions within tower 40 include flow rates of 0.1 to 10 w./hr./w., temperatures of 150° to 300° F., and pressures of atmospheric to 200 p.s.i.g. A product stream consisting essentially of normal and singly branched paraffins and substantially free of the doubly branched hydrocarbons is withdrawn through line 44 and preferably recycled to isomerization reactor 30 via lines 44 and 26 for further conversion into the more valuable doubly branched components, such as the dimethyl butanes.

When the doubly branched isomers appear in the effluent, or as soon thereafter as desirable, depending upon the purity required, the flow of feed through line 38 is halted and the doubly branched isomer recovery cycle begins. The recovery of the doubly branched paraffin may be effected by heating the adsorbent to a temperature above that at which the adsorption took place, usually within the range of about 300° to 500° F. at atmospheric pressures or about 200° to 400° F. if sub-atmospheric pressures are employed. A convenient method of heating fixed-beds of adsorbent is to recirculate through the bed a portion of the desorbed doubly branched paraffin which has been preheated to a higher temperature. Other methods of desorption may be employed such as displacement with steam, hydrocarbons boiling higher or lower than the doubly branched paraffin, gaseous olefins, etc.

In alternative operations, the aromatics may be separated from the hydroformate by solvent extraction or by adsorption on such material as silica gel, or even by employing the same complex zeolite of the present invention to separate both the dimethyl butanes and the aromatics from the naphtha stream. In such instances, the dimethyl butane is adsorbed first, followed by the aromatic. Desorption then yields a mixture of high octane dimethyl butanes and aromatics.

Though a fixed-bed process has been described, the process of the present invention may also be employed in conjunction with a moving-bed or a fluidized solids type of operation. The moving-bed type of contacting is particularly adapted to the adsorption-desorption cycles of this type of separation of singly branched from doubly branched paraffins; the desorbed dimethyl butanes are particularly suited for stripping dimethyl butanes from the adsorbent, particularly in the lower section of an adsorption zone employing such a movable bed.

The process of the present invention may be further illustrated by the specific examples below:

EXAMPLE 1

A cobalt amine exchanged crystalline sodium aluminosilicate prepared as described above for use in separating dimethyl-butane from methylpentane was prepared as follows: Four hundred grams (400 g.) of sodium zeolite pellets were placed in a 4-liter beaker and moistened with one liter of water. In a separate vessel, one pound (453 g.) of cobaltous chloride $$(CoCl_2 \cdot 6H_2O)$$

was dissolved in 3900 cc. of a solution comprising one liter of concentrated $NH_4OH$ (28% $NH_3$). Air was slowly bubbled through the solution for three days to form the complex cobalt amine. One-third (1300 cc.) of the cobalt solution was added to the alumino-silicate-water mixture and stirred intermittently for 90 minutes. The liquid was decanted and the sieve washed twice with 500 cc. portions of water. One liter of water was added to the sieves and a second 1300 cc. portion of cobalt amine solution was added. The mixture was stirred and rinsed as above. This procedure was repeated a third time. The sieve was then thoroughly washed and oven dried. The dried material comprised the  form of a alumino-silicate and was used in separation tests made on a 50/50 mixture of 2-methylpentane and 2,3-dimethylbutane.

EXAMPLE 2

To demonstrate the unique adsorptive properties of the cobalt amine exchanged sieve in preferentially retaining the most highly branched paraffin isomers, adsorption coefficient data were obtained with a feed comprising 2-methylpentane and 2,3-dimethylbutane. Similar tests were made with the conventional calcium, sodium, and cobalt(ous) forms of the sieve. These coefficients, or alpha values, were determined by passing the feed mixture in the vapor phase over a fixed-bed of the adsorbent until the effluent had the same composition as the feed. This showed that equilibrium had been reached. The flow of feed was then stopped and the remaining unadsorbed vapor in the bed was flushed out with nitrogen. The adsorbed hydrocarbon was then desorbed by steam at a temperature of 300° F. The following tabulation is a summary of these data:

*Adsorption coefficient data for sieve adsorbents*

| | $Co(NH_3)_6^{++}$ Sieve | Ca Sieve | Na Sieve | Co Sieve |
|---|---|---|---|---|
| Adsorption Temp., °F | 175 | 175 | 175 | 175 |
| Feed, cc./100 cc. Adsorbent | 117 | 114 | 112 | 106 |
| Composition: | | | | |
| Percent 2-Methylpentane | 50.0 | 50.0 | 50.0 | 50.0 |
| Percent 2,3-Dimethylbutane | 50.0 | 50.0 | 50.0 | 50.0 |
| Adsorbed Fraction: cc./100 cc. Adsorbent | 10 | 15 | 15 | <1 |
| Composition: | | | | |
| Percent 2-Methylpentane | 44.5 | 56.3 | 54.8 | ------ |
| Percent 2,3-Dimethylbutane | 55.5 | 43.7 | 45.2 | ------ |

The alpha value is an important physical relationship and characteristic of a system for separating close boiling components in a mixture. These adsorption coefficients are obtained by passing a binary mixture in the vapor phase over the adsorbent until several volumes of effluent are collected having the same composition as the feed; the adsorbed fraction is then recovered by suitable means, such as steam desorption. The alpha values are calculated as follows:

$$\text{Alpha } (\alpha) = \frac{\text{Percent component A (vapor)} \times \text{percent component B (adsorbed)}}{\text{Percent component B (vapor)} \times \text{percent component A (adsorbed)}}$$

Written in another way, $$\alpha = \frac{(N_1/N_2)^A}{(N_1/N_2)^V}$$

where $N_1$ and $N_2$ refer respectively to the mol fractions of components 1 and 2, component 1 being preferentially adsorbed. The superscripts A and V refer to the adsorbed and unadsorbed vapor phases, respectively.

The following tabulation summarizes the alpha values determined for the same mixture of 2-methylpentane and 2,3-dimethylbutanes with the various metallic derivatives of the 13 Angstrom zeolite described above.

*Separation factors for hexane isomers*

[Atmospheric pressure; 175° F.]

| 13A Sieve Modification | Separation Factor (Alpha Value) for 50% 2-MP+50% 2,3-DMB Feed | Hexane Isomer Adsorbed |
|---|---|---|
| $Co(NH_3)_6^{++}$ | 1.26 | 2,3-DMB. |
| Na | 1.21 | 2-MP. |
| Ca | 1.29 | 2-MP. |
| Co(ous) | Adsorptive capacity too low to determine. | |

What is claimed is:

1. An improved process for separating doubly branched aliphatic hydrocarbons from less highly branched chain hydrocarbons which comprises contacting a mixture of said hydrocarbons with a crystalline basic nitrogen complex metallic alumino-silicate adsorbent having a uniform pore opening of about 6 to 15 Angstroms in an adsorption zone, selectively adsorbing said doubly branched hydrocarbons, and withdrawing a stream substantially poorer in said doubly branched hydrocarbon from said zone.

2. The process of claim 1 wherein a product rich in said doubly branched hydrocarbon is recovered from said adsorbent.

3. The process of claim 1 wherein said complex aluminosilicate is prepared by reacting a crystalline sodium aluminosilicate having a pore diameter of about 10 to 13 Angstrom units with a complex amino salt of a group VIII metal.

4. The process of claim 3 wherein said salt is a cobalt amino complex.

5. The process of claim 3 wherein said salt is a nickel amino complex.

6. An improved process for separating singly branched from doubly branched paraffinic hydrocarbons which comprises passing a vaporized stream comprising said hydrocarbons into an adsorption zone, maintaining in said zone a zeolite having an empirical formula,

wherein Me is a metal selected from the class of cobalt and nickel, and x is an integer from 2 to 6, said zeolite having a uniform pore size of 10 to 13 Angstroms, withdrawing a stream rich in said singly branched hydrocarbon from said zone, desorbing said zeolite, and recovering a stream rich in said doubly branched hydrocarbon from said desorbate.

7. The process of claim 6 wherein said vaporized stream is a $C_5$ to $C_6$ stream, said singly branched hydrocarbon methyl pentane, and said doubly branched hydrocarbon dimethyl butane.

8. In a light naphtha isomerization process wherein a light virgin naphtha is isomerized to produce a product stream comprising methyl pentanes and dimethyl butanes, the improvement which comprises passing said vaporized stream through a bed of a metallic amine complex crystalline alumino-silicate having a uniform pore diameter of 10 to 13 Angstroms, separating a methyl pentane-rich stream from a dimethyl butane-rich stream, and passing said methyl pentane-rich stream to said isomerization process.

References Cited in the file of this patent

Linde Company form 9711–A, 1957 (How to Test Linde Molecular Sieves).

Linde Company form 9947, 1957 (Physical Properties of Linde Molecular Sieves).